Aug. 15, 1967 D. E. JANKE ETAL 3,335,501
ELECTRONIC DRY CONTROL WITH STORAGE CAPACITORS FOR DRYERS
Filed June 24, 1964 3 Sheets-Sheet 1
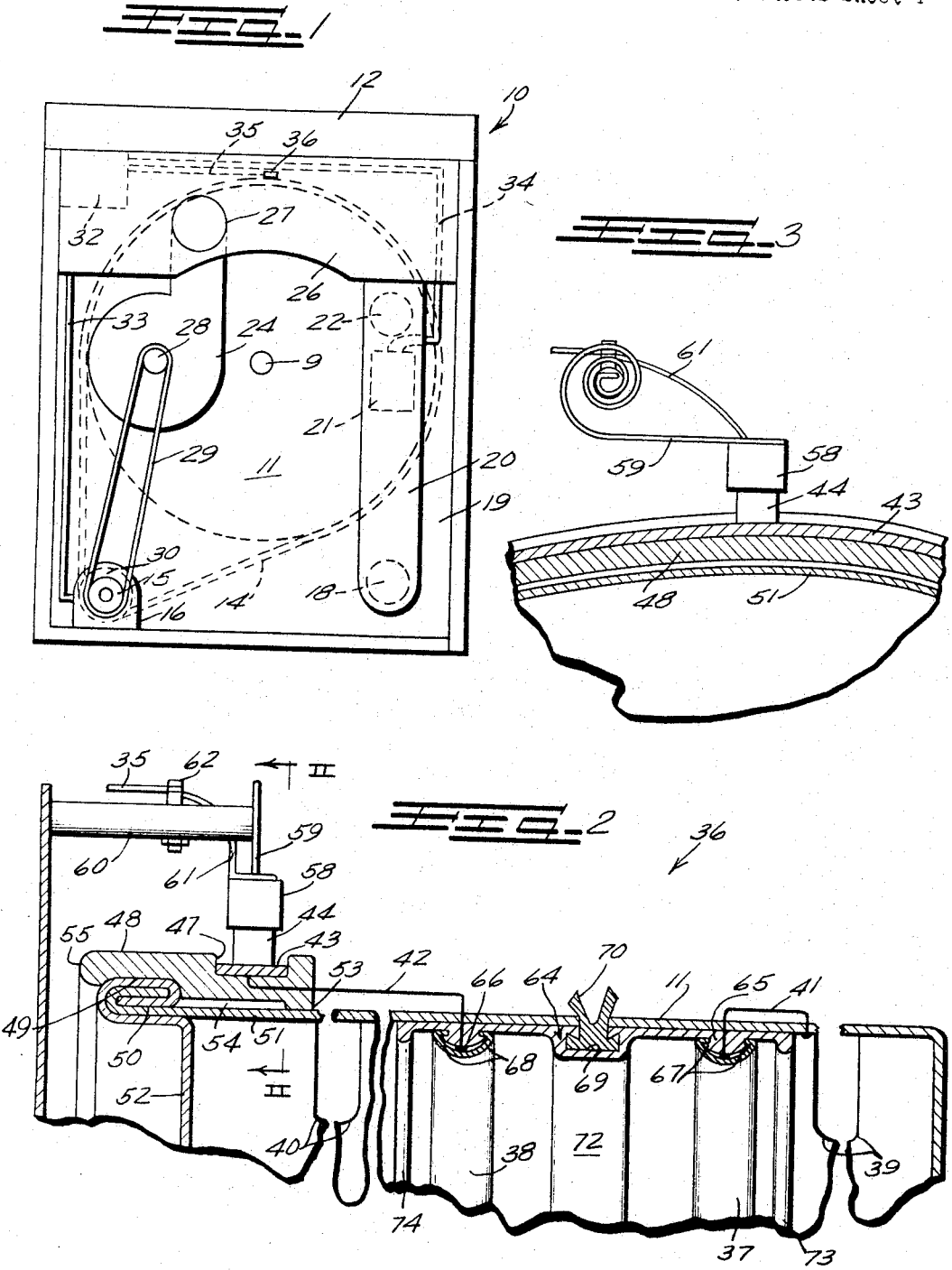
INVENTOR.
Donald E. Janke
Douglas J. Walker
BY Hill Sherman Meroni Gross & Simpson
ATTORNEYS

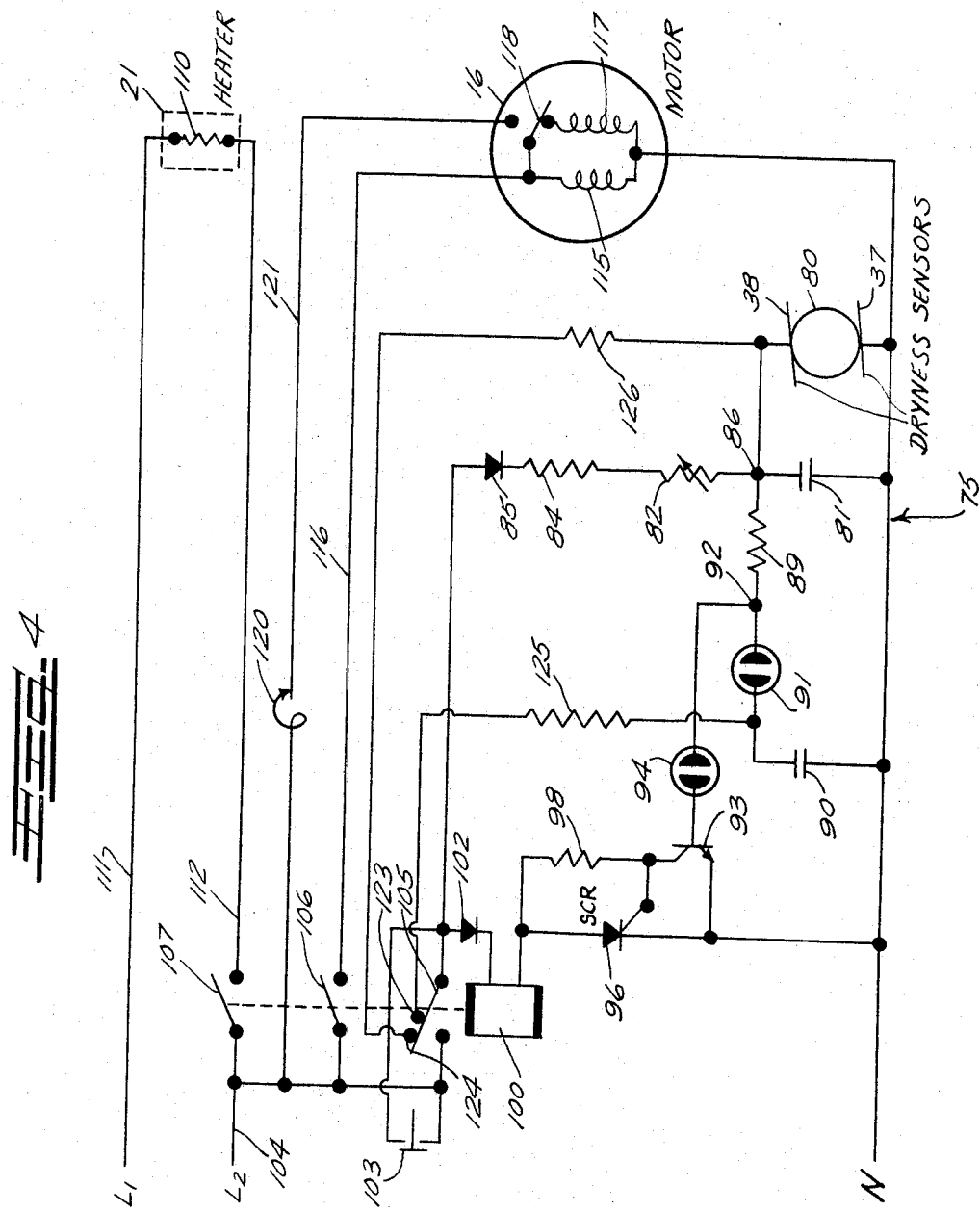

Aug. 15, 1967  D. E. JANKE ET AL  3,335,501
ELECTRONIC DRY CONTROL WITH STORAGE CAPACITORS FOR DRYERS
Filed June 24, 1964  3 Sheets-Sheet 3

INVENTOR.
Donald E. Janke
Douglas J. Walker
BY Hill, Sherman, Meroni, Gross & Simpson  ATTORNEYS 本
United States Patent Office 3,335,501
Patented Aug. 15, 1967

3,335,501
ELECTRONIC DRY CONTROL WITH STORAGE CAPACITORS FOR DRYERS
Donald E. Janke, Benton Harbor, and Douglas J. Walker, St. Joseph, Mich., assignors to Whirlpool Corporation, Benton Harbor, Mich., a corporation of Delaware
Filed June 24, 1964, Ser. No. 377,741
8 Claims. (Cl. 34—45)

This invention relates to a clothes dryer and more particularly to a clothes dryer dryness measuring and control system in which a desired degree of dryness is obtained automatically and with a high degree of reliability despite variations in operating conditions and changes in circuit parameters and other variables. The system of this invention attains such results in a highly efficient and yet inexpensive manner, using a minimum number of component parts.

The illustrated embodiment of the invention is incorporated in a home type clothes dryer but it will be understood that various principles and features of the invention can be applied to other types of material handling systems, the terms "clothes" and "clothes dryer" being used herein in a generic sense to include equivalent materials and systems.

In accordance with the invention, a dryness sensing and timing circuit is used of a type in which an output signal is produced after a delay which decreases with increasing dryness. This circuit may comprise a first capacitor connected through a charging resistance to a voltage source, with a current path through the clothes being provided in shunt relation to the capacitor, and a second capacitor which is subsequently charged, after a predetermined time interval by the first capacitor to produce a control signal for operating the clothes dryer.

In prior systems, the output signal from such a sensing and timing circuit has been used to deactivate the heating means of the dryer. Such prior systems have been generally satisfactory but have required careful adjustment of comparatively expensive components, and have also required that the operating voltages, circuit parameters and other conditions be maintained substantially constant.

According to this invention, a dryness sensing and timing circuit is automatically recycled several times while the heating means of the dryer is not deactivated until some subsequent output signal from the sensing circuit is received. With this feature, it is found that the adjustment, operating conditions and parameters of the circuit are not critical and at the same time, the desired degree of dryness of clothes may be obtained automatically despite wide variations in conditions such as the initial moisture content of the clothes, the amount of clothes in the dryer, the type of fabric, ambient temperature and humidity conditions, and the like.

An important feature of this invention resides in the ability of the sensing and recycling circuit to control the dryer for a predetermined period of time after an initial condition of dryness is reached to insure complete dryness of all clothes in the dryer. However, if clothes which are still wet but did not come in contact with the dryness sensing device before an initial condition was sensed and should come in contact therewith after the initial condition of dryness is sensed the recycling circuit will be held in abeyance until such wet clothes are also dryed to an initial condition.

An object of the present invention is to provide an improved dryness control system having combination circuits of resistance and capacitance which are used for detecting an initial condition of dryness of the clothes and are also used for timing the operation of the dryer after the initial condition of dryness has been reached.

Another object of the present invention is to provide a novel means by which the operation of the charging capacitors is held within the more linear portion of the voltage versus time curve, while still affording a substantially long timing cycle which can be consistently repeated.

Still another object of the present invention is to provide a novel means to compensate for such undesirable conditions as when a zipper or other conductive object comes in contact with the dryness sensing devices after the clothes have reached an initial condition of dryness thereby not allowing the complete timing cycle to repeat but only a small portion thereof.

Further important features of the invention reside in a comparatively simple but highly reliable circuit arrangement for obtaining the recycling action of the sensing circuit.

This invention contemplates other objects, features and advantages which will become more fully apparent from the following detailed description taken in conjunction with the accompanying drawings which illustrate a preferred embodiment and in which:

FIGURE 1 is a diagrammatic elevational view of the rear side of a dryer incorporating a dryness control system according to this invention;

FIGURE 2 is a sectional view of a rotatable drum used in FIGURE 1, illustrating a dryness sensing assembly;

FIGURE 3 is a sectional view taken substantially along line II—II of FIGURE 2, illustrating the mounting of a contacting brush;

FIGURE 4 is an electrical circuit diagram illustrating the capacitor recycling circuit arrangement of this invention;

Figure 5:
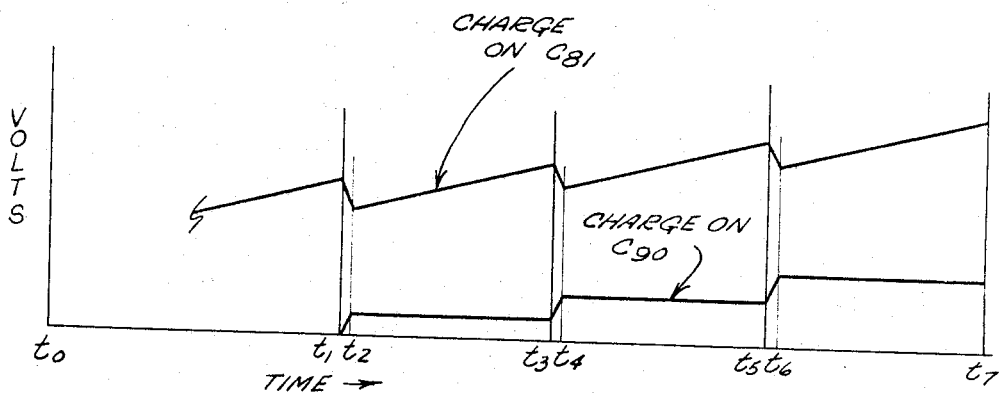
FIGURE 5 is a graphical representation of the charging cycles in the capacitors used in FIGURE 4, during long time settings.

Reference numeral 10 generally designates a clothes dryer incorporating the dryness control system of this invention, wherein the dryness of clothes is sensed by electrical resistance measurement to automatically control energization of drive and heating means. It will be understood that the dryness control system of this invention, and various features thereof, may be applied to dryers of types different from that illustrated.

In the illustrated dryer 10, clothes to be dried are placed within a drum 11 disposed within a casing 12 and journaled on a hub 9 for rotation about a horizontal axis. To drive the drum 11 and tumble clothes therewithin, a belt 14 is trained about the periphery of the drum 11 and about a pulley 15 driven by an electric motor 16. For drying the clothes, air enters from the lower portion of the casing 12 and through an inlet opening 18 in a back panel 19 of the casing 12 and into a duct 20 having an electric heater 21 therewithin. Heated air from the duct 20 passes through an outlet opening 22 and into the drum 11, through openings in the back wall thereof. The air, after picking up moisture from clothes within the drum, is withdrawn from the drum into the inlet of a blower 24 which discharges through partial back wall 26 through a vent opening 27 and through a suitable pipe (not shown) to the outside atmosphere. The blower is driven by a pulley 28 driven through a belt 29 from a pulley 30 on the shaft of the motor 16.

The motor 16 and heater 21 are connected to a control unit 32 through cables 33 and 34, the control unit 32 being connected through a wire 35 to a dryness sensing assembly 36. The invention does not reside in the dryness sensing assembly 36 by itself, but it will be first described in detail, to facilitate an understanding of the recycling feature of this invention, which is described in detail hereinbelow in connection with the electrical circuit diagram of FIGURE 4.

As shown in FIGURE 2, the dryness sensing assembly 36 comprises a pair of spaced bands 37 and 38 of conductive material, preferably stainless steel, mounted within the drum 11 at positions intermediate rows of tumbling baffles 39 and 40. The ring 37 is electrically connected through a wire 41 to the drum 11 which is electrically connected through the drum-support bearings to the casing 12 of the dryer, the casing forming an electrical ground of the system. The ring 38 is connected through a wire 42 to a slip ring 43 of conductive material, preferably stainless steel, on the outside of the drum 11. The ring is engaged by a contactor brush 44 which is connected through the wire 35 to the control unit 32.

As described hereinbelow in connection with the electrical circuit diagram of FIGURE 4, the control unit 32 controls the drive and heating means in response to the electrical resistance presented by the clothes between the rings 37 and 38, as measured between the wire 35 and the casing 12, the electrical resistance being relatively low when the clothes are wet and being increased as the clothes approach the dry state.

To support the slip ring 43 on the drum 11, it is disposed in a groove 47 in the outer surface of a strip 48 of insulating material, preferably an extruded strip of polypropylene material, the strip 48 forming a complete ring about the periphery of the drum. The strip 48 has a groove 49 in its inner surface which engages over a bead 50 on the drum 11, formed by the junction between the edge portion of an outer cylindrical wall 51 of the drum and the outer peripheral edge portion of a front wall 52 of the drum. The strip 48 additionally has a radially inwardly projecting portion 53 engaging the drum to space an internal surface portion 54 of the strip 48 from the opposed surface of the drum 11. The dimensioning of the parts is such that the strip 48 is stressed against tension in the slip ring 43 to maintain the parts in firm assembly. Assembly of the parts is facilitated by providing a rounded edge 55 on the forward portion of the strip 48.

FIGURE 3 shows the support of the brush 44 which is preferably of a metal graphite material, disposed in a holder 58 which is secured to one end of a spring wire 59 having a coiled portion and has the opposite end secured to a rod 60 of insulating material supported from the casing 12. A copper braided wire 61 extends from the brush holder 58 to a terminal 62, to which the wire 35 is attached.

To support the bands 37 and 38 on the interior of the drum, a strip 64 of insulating material, preferably extruded polypropylene, is provided forming a ring in engagement with the internal surface of the drum 11, intermediate the tumbling baffles 39 and 40. The strip 64 has a pair of radially inwardly extending annular ribs 65 and 66 with projections 67 and 68 from opposite sides of the ribs 65 and 66 spaced axially inwardly from opposed surface portions of the strip 64 to define annular grooves which receive turned-in edge portions of the bands 37 and 38 to firmly hold the bands in position. The strip 64 is additionally formed with a groove 69 projecting inwardly from the outer surface thereof and of generally T-shaped configuration, to receive the heads of a plurality of securing clips 70 which have reduced diameter shank portions projecting through openings in the cylindrical wall 51 of the casing 12, the outer ends of the clips 70 being deformed to lock the same in position after assembly.

The strip 64 has a central portion 72 which is thicker than the side portions thereof to allow for the groove 69 while minimizing the weight and amount of material in the strip. The edges of the portion 72 are preferably rounded, and rounded reinforcing beads 73 and 74 are also provided on the edges of the strip 64.

According to the important features of this invention reference is now made to the electrical circuit diagram of FIGURE 4 in which a dryness sensing control is generally designated by reference numeral 75. The sensing bands 37 and 38 have disposed therebetween a batch of wet clothes symbolically represented by reference numeral 80, which for purposes of representation can be considered as a variable resistor changing value with corresponding changes in dryness of the clothes.

A capacitor 81 is connected in parallel with the wet clothes 80 and is connected in series with a variable resistor 82, a resistor 84 and a half wave rectifier 85. Also connected to the capacitor 81 at a circuit point 86 is a resistor 89, which has the other end thereof connected to a capacitor 90 through a discharge neon lamp 91. Between the resistor 89 and the discharge neon lamp 91 is formed a circuit point 92 to which the base electrode of a transistor 93 is connected through a second discharge neon lamp 94. The emitter electrode and the collector electrode of the transistor 93 are connected to a cathode electrode and a gate electrode respectively of a silicon controlled rectifier 96. One lead of a resistor 98 is connected to the collector electrode of the transistor 93 and the gate electrode of the silicon controlled rectifier 96 and the other lead of the resistor 98 is connected to the anode of the silicon controlled rectifier 96 and to a relay 100. The relay 100 connected in series with the silicon controlled rectifier 96 to receive control signals therefrom also is in series with a diode 102 which is connected through a switch 103 to the line 104. The relay 100 has operational contactors 105, 106 and 107 mounted thereon for operation of various functions of the dryer 10.

The heater 21, which may be of the electrical resistance type, has a heating element 110 connected to a pair of conductors 111 and 112 for receiving a source of electrical current. The contactor 106 is connected to a run winding 115 through a conductor 116, while the conductor 116 is connected to a start winding 117 through a centrifugal switch 118 located in the motor 16. The centrifugal switch 118 has one terminal thereof connected to a cool-down thermostat 120 through a conductor 121. Connected to a pair of terminals 123 and 124, shorted together by the contactor 105, are a pair of resistors 125 and 126, respectively, which have their other ends connected to the capacitor 90 and capacitor 81 respectively to provide discharge paths therefrom.

The operation of the dry sensing control 75 will be better understood with reference taken from the graphical representation of the charging cycle on the capacitors 81 and 90, which are shown in FIGURE 5.

When a batch of wet clothes 80 is placed in the drying drum 11 and disposed between the sensing bands 37 and 38 to effectively form a short circuit therebetween, the switch 103 is momentarily closed to initiate the drying cycle. This action, will close the contactor 107 to render the heater 21 operative, will close the contactor 106 applying a source of power to the motor 16 through lines 116 and will close the contactor 105 to apply power to the sensing and recycling circuit while at the same time acting as an interlock for the relay 100. The relay 100 receives energizing current from the lines 104 through the contactor 105 and diode 102, and the current passes therefrom through the silicon controlled rectifier 96 which is subsequently controlled by control signals responsive to the dryness of clothes in the drum 11.

The time interval $t_0$–$t_1$ is initiated when switch 103 is closed, and represents an undeterminable period of time corresponding to the amount of clothes placed in the dryer, the wetness of the clothes and the amount of heat applied for drying purposes. During the time interval $t_0$–$t_1$ the capacitor 81 is charged from the line 104 through the contactor 105, half wave rectifier 85, resistor 84, and variable resistor 82, which for purposes of illustration is adjusted for maximum resistance. As mentioned hereinabove the wet clothes 80 disposed between the sensing bands 37 and 38 act as a variable resistor, which when the clothes are wet the resistance is minimum and as the clothes become dry the resistance approaches a maximum value. The charge on the capacitor 81 will be shunted by the wet clothes 80 disposed between the sensing bands 37 and 38 and the charge will increase as the current passing between the sensing bands 37 and 38 decreases. Time $t_1$ (FIGURE 5) represents an initial condition of dryness of the clothes 80 from which point a recycling condition occurs to insure complete dryness of all clothes placed in the dryer.

By way of example and not by way of limitation, the discharge neon lamp 91 will be rendered conductive when a difference of potential of 60 volts exists thereacross, while the discharge neon lamp 94 will be rendered conductive when a difference of potential of 90 volts exists thereacross. As the clothes 80 become dryer, and the time $t_1$ is approached, the charge across the capacitor 81 is approaching 60 volts. When the charge of the capacitor 81 has reached the breakover voltage of the discharge neon lamp 91 a charging current will flow into the capacitor 90 until the charge on the capacitor 81 has decreased to the turn-off voltage of the discharge neon lamp 91, which is represented by time interval $t_1$–$t_2$ in FIGURE 5. The capacitor 81 will then charge to a value of 70 volts at a rate not exceeding that determined by the RC time constant of resistors 82 and 84 and the capacitor 81 until the time $t_3$ is reached, but in cases where the clothes are still damp the rate of charge may be decreased providing longer time intervals between recycling. Again at the time $t_3$, the discharge neon lamp 91 is rendered conductive thereby discharging the capacitor 81 into the capacitor 90 until the turn-off voltage of the discharge neon lamp 91 is reached.

It can be seen therefore, by repeating the action described above, the voltage charge across the capacitor 81 must increase each time the voltage charge across the capacitor 90 increases to maintain a discharge potential of 60 volts across the discharge neon lamp 91. The capacitor 81 will continue to discharge through the neon lamp 91 for a time interval $t_3$–$t_4$ and at the end thereof the neon lamp 91 will be rendered nonconductive. At time $t_4$ the capacitor 81 will again be charged through the resistors 82 and 83 and continue to charge during the time interval $t_4$–$t_5$, which is again terminated by the conduction of the neon lamp 91 to again raise the voltage across the capacitor 90. During the time interval $t_5$–$t_6$ the capacitor 81 is discharged through the neon lamp 91 into the capacitor 90 until the charge across the capacitor 90 is equal to 30 volts and the charge across the capacitor 81 is equal to 70 volts producing the required turn-off voltage across the neon lamp 91 of 40 volts. The discharge neon lamp 91 which now has 30 volts applied to one side thereof from the storage capacitor 90, will require the storage capacitor 81 to have 90 volts applied thereacross to provide 60 volts across the neon lamp 91. As mentioned hereinabove, the discharge lamp 94 requires a potential of 90 volts for conduction. Therefore, when the charge across the capacitor 81 rises to 90 volts the neon lamp 94 will discharge the capacitor 81 into the base electrode of the transistor 93 for shunting the control signal between the gate and cathode electrodes of the silicon controlled rectifier 96.

By using the two charging capacitors 81 and 90 and the two discharge devices 91 and 94 in the timing circuit of the dryness control 75, improved characteristics are thereby obtained. In contrast, using only one large value charging capacitor in the timing circuit would have the disadvantage of being too large and insensitive to be discharged by the drying clothes, which would result in the drying operation terminating too late or not at all. On the other hand, if a single charging capacitor is small enough to respond to the initial drying condition of the clothes, it will not provide the additional timing desirable for total dryness of the clothes. Through experimentation, it has been determined that the preferred value of capacitor 81 is between 3 and 5 microfarads. The value of capacitor 90 is determined by the time interval desired to stop the dryer after the initial condition of dryness has been sensed. Another important advantage obtained by the use of two capacitors having separate discharge means is that a false indication of wetness, which may occur when a conductive object contacts sensing bands 37 and 38 after the initial condition has been reached, will add only one incremental charge to capacitor 81 thereby changing the total drying cycle only slightly.

During the drying cycle of the dryer 10, the relay 100 is held energized by half-wave AC signals applied thereto through the diode 102 and silicon controlled rectifier 96. Since the relay 100 is held energized by its interlock contactor 105, the current therethrough must be interrupted by other switch means for deenergization, and is accomplished by the silicon controlled rectifier 96. During each conductive half-cycle applied to the relay 100, control current will flow from the cathode electrode to the gate electrode and therefrom through a current limiting resistor 98 to maintain the silicon controlled rectifier 96 in the conductive state. When 90 volts is applied to the capacitor 81 the neon lamp 94 is rendered conductive and the transistor 93 is rendered conductive to saturation thereby shunting any control current which may flow in the cathode to the gate circuit of the silicon controlled rectifier 96, thereby rendering the controlled rectifier 96 inoperative. This action, when the silicon controlled rectifier 96 is rendered non-conductive, will cause the relay 100 to become deenergized thereby releasing the contactors 105, 106 and 107 to complete the heated portion of the drying cycle of the dryer 10. When contactor 105 is deactuated it will connect terminals 123 and 124 for discharging capacitors 81 and 90, thereby insuring the capacitors 81 and 90 will be completely discharged at the beginning of each drying cycle.

The motor 16 is a conventional two-winding induction motor having a start winding 117, a run winding 115 and a centrifugal switch connected thereto to disengage the start winding 117 when the motor 16 reaches a sufficiently high r.p.m. The motor 16 is initially rendered operative when the contactor 106 is closed at the beginning of the drying cycle. However, when the contactor 106 is opened at the end of the drying cycle, the motor 16 will continue to receive operating current from the line 104 through the centrifugal switch 118 and the cool-down thermostat 120 until the contacts thereof are opened in response to the cooling of the dryer 10.

Figure 6:
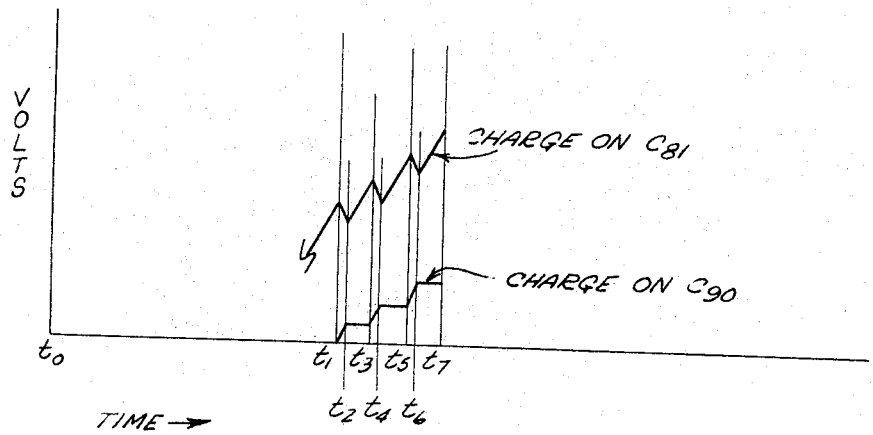
FIGURE 6 is a graphical representation of the charging cycles in the capacitor used in FIGURE 4, during short time setting.

FIGURE 6 shows a graphical representation of the charging condition on capacitors 81 and 90 when the adjustable resistor 82 is set for minimum resistance, thereby decreasing the time between $t_1$ and $t_7$ as shown in FIGURES 5 and 6. The operation of the dry sensing and recycling circuit during the shorter preset time is similar to that mentioned hereinabove with the exception of the time required to recharge capacitor 81 between time intervals $t_2$–$t_3$, $t_4$–$t_5$, and $t_6$–$t_7$.

By way of example, and not by way of limitation, the time intervals $t_2$–$t_3$, $t_4$–$t_5$, and $t_6$–$t_7$, in FIGURE 5, represent six minute increments, while the time intervals $t_2$–$t_3$, $t_4$–$t_5$ and $t_6$–$t_7$, in FIGURE 6, represent one minute increments and the time intervals $t_2$–$t_3$, $t_4$–$t_5$ and $t_6$–$t_7$ represent one minute. It can be seen therefore, that the optimum time interval from $t_1$, initiated by a state of dryness of the clothes 80 in the dryer 10, can be varied from approximately 3 minutes beginning at time $t_1$ to approximately 18 minutes beginning at time $t_1$.

It will be understood that modifications and variations may be made without departing from the spirit and scope of the novel concepts of this invention.

The embodiments of the invention in which an exclusive property or privilege is claimed are defined as follows:

1. A dryness control for a dryer having a heater and having a motor for rotating a drum,
    means in the drum for sensing the moisture content of a batch of clothes,
    a recycling circuit connected to said means for operation therefrom when an initial condition of dryness is sensed by said means, said recycling circuit comprising:
        a discharge device in circuit with said means, a silicon controlled rectifier connected to said discharge device, first and second storage capacitors, means for connecting said first and second storage capacitors to respective opposite ends of said discharge device and in series therewith, means for accumulating a charge on said second storage capacitor whereby said first storage capacitor must be recharged to perform a timing function,
        and a relay connected to said silicon controlled rectifier for deenergization when the silicon controlled rectifier is rendered non-conductive in response to said recycling circuit.

2. A dryness control for a dryer having a heater and having a motor for rotating a drum,
    means in the drum for sensing the moisture content of a batch of clothes,
    a recycling circuit connected to said means for operation therefrom when an initial condition of dryness is sensed by said means,
    said recycling circuit comprising a voltage source for rendering said means operative,
    a first capacitor in shunt with said means,
    a first discharge device,
    a second capacitor connected in series with said first capacitor and said first discharge device,
    said first and second capacitors connected to respective opposite ends of said first discharge device,
    a second discharge device in circuit with said first capacitor and said first discharge device and having a higher discharge voltage than said first discharge device,
    a silicon controlled rectifier,
    a relay in series with said silicon controlled rectifier for energizing the heater and motor in said dryer,
    and a variable shunt connected between the cathode and gate electrodes of the silicon controlled rectifier for changing impedance in response to signals received from said second discharge device.

3. The dryness control of claim 2 in which the variable shunt is a transistor.

4. The dryness control of claim 2 in which first and second discharge devices are neon lamps.

5. In a dryness control circuit for a clothes dryer having heating means, a dryness measuring and timing circuit comprising:
    first storage capacitor,
    means for charging said first storage capacitor,
    second storage capacitor,
    means responsive to said first storage capacitor to charge said second storage capacitor,
    means for connecting said responsive means to said first and second capacitors,
    means providing a current path in shunt with said first storage capacitor for increasing the rate of charge of said first storage capacitor in response to increasing dryness of clothes,
    means for accumulating the charge on said second storage capacitor whereby said first storage capacitor must be recharged to perform a timing function and for producing a control signal when the charge of said first storage capacitor is added to the charge of said second storage capacitor to obtain a certain value,
    and means responsive to said control signal for deactivating said heating means.

6. In a clothes dryer including a drum supported for rotation to tumble clothes therewithin and control means for passing heated air through the drum to dry the clothes, a dryness measuring and timing circuit comprising:
    a first storage capacitor,
    means including a source of voltage and resistance means for charging said first storage capacitor,
    a second storage capacitor,
    means responsive to said first storage capacitor to charge said second storage capacitor,
    means connecting said responsive means to said first and second storage capacitors,
    contact means in said drum for engaging said clothes,
    means connecting said contact means in circuit with said first storage capacitor to provide a current path in shunt with said first storage capacitor for increasing the charge of said first storage capacitor in response to increasing dryness of clothes,
    means including said responsive means to produce a first control signal when the voltage across said first storage capacitor reaches a certain value,
    and means responsive to said first control signal to produce a second control signal when the voltage across said first storage capacitor reaches a higher value for deactivating said heating means.

7. In a clothes dryer including a drum supported for rotation to tumble clothes therewithin and control means for passing heated air through the drum to dry the clothes, a dryness measuring and timing circuit comprising:
    a first storage capacitor,
    means including a source of voltage and resistance means for charging said first storage capacitor,
    a second storage capacitor,
    discharge means responsive to the voltage charge across said first storage capacitor to charge said second storage capacitor,
    means connecting said discharge means to said first and second storage capacitors,
    contact means in said drum for engaging the clothes,
    means connecting said contact means in circuit with said first storage capacitor to provide a current path in shunt with said first storage capacitor for increasing the charge of said first storage capacitor in response to the increasing dryness of the clothes,
    said second storage capacitor and said discharge means arranged to provide a recycling circuit for recharging said first storage capacitor,
    means to produce a control signal when the combined voltages across said first and second storage capacitors reach a certain value, and
    switch means responsive to said control signal for deactivating said heating means.

8. In an appliance having sensing means for sensing a preselected condition; the improvement therein comprising,
    a single integrated sensing and timing circuit including,
    a first capacitor connected in circuit with said sensing means to be charged in response thereto,
    a second capacitor,
    voltage discharge means,
    means connecting said voltage discharge means between said first and second capacitors to discharge said first capacitor into said second capacitor, and
    means for accumulating a charge on said second capacitor thereby causing said first capacitor to be recharged in response to said sensing means to perform a timing function.

(References on following page)

References Cited

UNITED STATES PATENTS

| | | | |
|---|---|---|---|
| 3,180,038 | 4/1965 | Chafee | 34—45 |
| 3,221,417 | 12/1965 | Mellinger | 34—45 |
| 3,222,798 | 12/1965 | Thornbery et al. | 34—45 |
| 3,266,167 | 8/1966 | Finnegan | 34—45 |
| 3,271,878 | 9/1966 | Martin | 34—45 |

FOREIGN PATENTS

| | | |
|---|---|---|
| 1,297,340 | 5/1962 | France. |
| 877,553 | 3/1961 | Great Britain. |

FREDERICK L. MATTESON, Jr., *Primary Examiner.*

DONLEY J. STOCKING, *Examiner.*

D. A. TAMBURRO, *Assistant Examiner.*